United States Patent

[11] 3,602,242

| [72] | Inventor | Richard C. Mott<br>Harwood Heights, Ill. |
|---|---|---|
| [21] | Appl. No. | 23,915 |
| [22] | Filed | Mar. 30, 1970 |
| [45] | Patented | Aug. 31, 1971 |
| [73] | Assignee | Honeywell, Inc.<br>Minneapolis, Minn. |

[54] CONDITION CONTROLLER
8 Claims, 7 Drawing Figs.

[52] U.S. Cl. .................................................. 137/85
[51] Int. Cl. .................................................. G05d 16/00, G05d 23/00
[50] Field of Search .................................. 137/85, 86; 235/200 WB

[56] References Cited
UNITED STATES PATENTS

| 3,491,229 | 1/1970 | Mitgashen | 235/200 X |
| 3,348,771 | 10/1967 | Krager | 235/200 |

*Primary Examiner*—Alan Cohan
*Attorney*—Lamont B. Koontz

ABSTRACT: A condition controller of the type used in a pneumatic control system having wholly independent setpoint adjustment means and proportional band adjustment means. The proportional band adjustment comprises a plurality of feedback elements selectively operable to vary the amount of feedback and therefore the proportional band. Compensating means are provided which nullify the affect on the set point of rendering one or more of the feedback elements operable or inoperable.

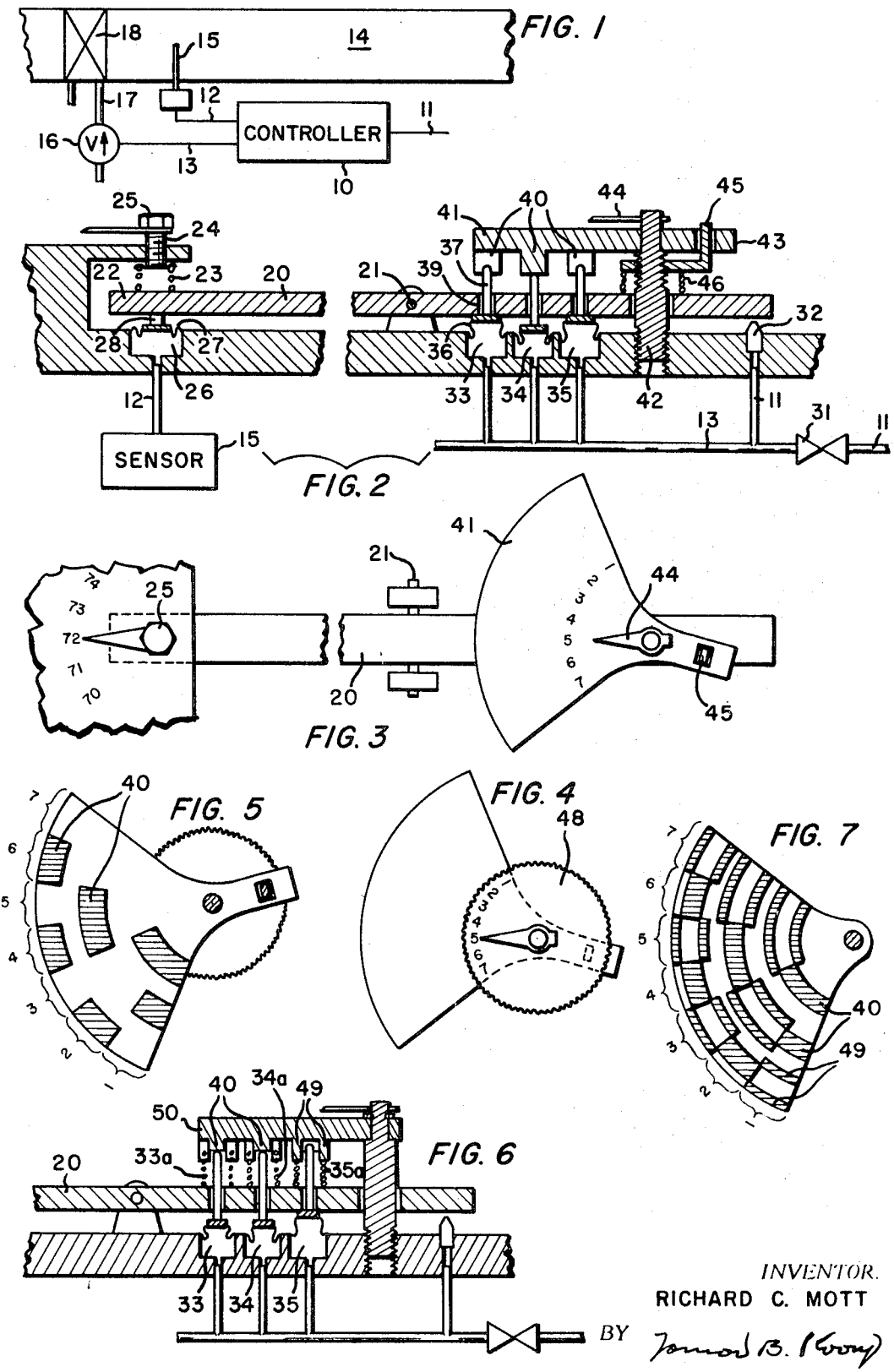

CONDITION CONTROLLER

BRIEF SUMMARY OF THE INVENTION

The controller of the subject invention utilizes variable authority feedback as the means of changing or adjusting proportional band. More particularly the condition controller of the subject invention utilizes a plurality of feedback elements which may be selectively rendered operable or inoperable whereby the total feedback is varied. In addition a novel compensating or force-exerting means is disclosed which compensates for the effect on the beam position brought about by varying the authority of the feedback. Means of adjusting the authority of the feedback or of rendering combinations of the feedback elements operable or inoperable so as to vary the total feedback and of simultaneously adjusting the compensating means are also provided.

The preferred embodiment of the subject invention comprises a beam pivotably mounted intermediate its length. A force is applied at one end of the beam by a condition-responsive device responding to a condition such as temperature or humidity. In opposition to this force is a second force imposed by set-point means such as a spring in conjunction with a threaded member. The control nozzle for the device is located at the other end of the beam. This arrangement is such that an increasing signal due to a condition change imposes a force on the beam in opposition to the force imposed by the set-point means and tends to close off the nozzle. Intermediate the beam length are located feedback elements arranged to impose forces on the beam tending to rotate the beam in a direction to oppose closing of the nozzle. Also intermediate the beam length is located means, such as spring means, to impose a force or forces on the beam which oppose the feedback forces imposed on the beam. A dial arrangement is provided which introduces the feedback forces and opposing spring force or forces in such a way that no rotation of the beam about the pivot point takes place. Hence, the branch line pressure remains constant.

DESCRIPTION OF THE DRAWING

In the drawing:

FIG. 1 is a schematic illustration of a system wherein the controller of the subject invention may be utilized.

FIG. 2 is a schematic side view of the condition controller with parts in section.

FIG. 3 is a top view of the controller of FIG. 2.

FIG. 4 is an alternative configuration of the dial arrangement of FIGS. 2 and 3.

FIG. 5 is a bottom view of FIG. 4.

FIG. 6 is an alternative embodiment of the feedback element and compensating spring arrangement of FIG. 2.

FIG. 7 is a bottom view of member 50 in FIG. 6.

In the following detailed description a pneumatic control system will be described for the sake of clarity. In addition, it will be assumed that the condition which is to be controlled is the temperature of air. It should, of course, be understood that the invention of this application is not to be so limited.

In FIG. 1 the controller of this invention is generally denoted by the numeral 10. The controller 10 is connected through piping 11 to a source of air pressure not shown. Also connected to the controller is a remote sensor 15 which senses the temperature of air in a duct 14 and transmits a signal, by way of fluid pressure, to the controller 10 through capillary 12. In response to this signal the controller transmits a second signal, in the form of air pressure, through the branch line 13 to a valve 16 or the like. This change in branch line pressure causes a repositioning of valve 16 which results in a change in the condition-changing medium through pipe 17 to coil 18. A change in the condition or in the temperature of the air in the duct 14 is thereby affected.

In FIG. 2 is a schematic elevation view of the controller 10 shown in FIG. 1, with parts in section. This controller comprises a beam 20 pivotably mounted intermediate its length at 21. At one end 22 of the beam, set-point means including spring means 23 and a threaded member 24 impose a force on the beam. This set-point means is adjustable through dial 25 to attain a desired temperature. Disposed opposite to the set-point means at end 22 to beam is a diaphragm unit connected to capillary 12. In response to a change in temperature, a bulb 15 causes a pressure to be transmitted through capillary 12 to unit 26. An increase in temperature causes an increased pressure signal which, through diaphragm 27 and pin 28, imposes a force on the beam.

At end 30 of the beam is a nozzle 32 which is connected through restriction 31 and piping 11 to a source of air pressure not shown. Connected to piping 11 in between nozzle 32 and restriction 31 is branch line 13, which communicates with feedback elements 33, 34 and 35, as well as the valve 16 in FIG. 1.

Each of the feedback elements is comprised of a diaphragm 36 and a pin 37. Each of the pins is adapted to be engaged by lugs 40 which are attached to or form a part of a fan-shaped member 41. When the pin 37 of a feedback element is not engaged by a lug 40, a portion 38 of the diaphragm is constructed and arranged to abut the beam 20. When the pin 37 of a feedback element is engaged by a lug 40, the feedback element does not come in contact with the beam at all and is completely inoperative in the system. The pins 37 extend through apertures 39 in the beam to engage the lugs 40.

The fan-shaped member 41 is pivotably secured to the top of a threaded member 42. One end of the fan-shaped member 41 may serve as a lever 43 so that the member 41 may be manually rotated about the top of threaded member 42. A pointer 44 is rigidly affixed to the top of the threaded member 42 and serves as a reference as illustrated in FIG. 3. Disposed between the fan-shaped member 41 and the beam 20 is a member 45 which is threaded and engaged with the threaded member 42. A portion of this member 45 extends through an opening in the fan-shaped member 41. As member 41 is rotated atop the threaded member 42, the member 45 moves up or down the threaded member 42 thereby compressing spring 46 or allowing spring 46 to extend.

In the preferred embodiment the feedback elements 33, 34 and 35 are binary coded in that element 34 provides twice as much feedback as element 33 and element 35 provides four times as much feedback as element 33. In order to affect this relationship, it is only necessary that the product of the diaphragm area of element 34 and its distance from the fulcrum 21 be twice the product of the diaphragm area of element 36 and its distance from the fulcrum 21. Similarly the product of the diaphragm area of element 35 and its distance from the fulcrum must be four times the product of the diaphragm area of element 33 and its distance from the fulcrum 21. If the lugs 40 on the underside of fan-shaped element 41 are properly arranged, this binary coding of the feedback elements allows one to increase the effective feedback in increments of 1 to 7 by merely turning the lever portion 43 of the fan-shaped member 41. Feedback elements 33 and 35 are shown abutting the beam which corresponds to five increments of feedback.

The spring 46 is so designed that as the fan-shaped member is rotated atop threaded member 42, the member 45 moves down the threaded member and thereby compresses spring 46 and imposes an increasing force on the beam 20 which compensates for the increasing feedback forces imposed on the opposite side of the beam by the feedback elements 33, 34 and 35. Hence, as the fan-shaped member 41 is rotated and the feedback in the system is increased or decreased, the spring force imposed on the beam is similarly increased or decreased resulting in no net movement of the beam away from or towards the nozzle 32. The branch line pressure thereby remains constant and no change in set point takes place.

In FIG. 3, a top view of FIG. 2, the fan-shaped member 41 is shown as well as the pointer 44. An arrow or the like is shown on member 41 which turns with respect to member 44. Numbers from 1 to 7 are shown on member 44 which indicate the increments of feedback which may be dialed into the controller. At the opposite end of the beam is shown a dial member 25 and similar indicator pointing to the temperature at which the controller is set to control.

FIG. 4 discloses an alternative embodiment of the dial arrangement shown in FIGS. 2 and 3. Instead of a lever arrangement 43 at one end of the fan-shaped member, a knurled member 48 is introduced which is affixed to the fan-shaped member as aforementioned. The same arrow and numeral means of indication are disclosed.

FIG. 5 is a view of the underside of the fan-shaped member disclosed in FIGS. 2 and 3. A configuration of lugs 40 is shown which will result in incremental increases of the feedback of 1 to 7 upon turning the dial member 48.

FIG. 6 is an alternative embodiment of the feedback element configuration shown in FIG. 2. Instead of a single spring 46 surrounding a threaded member 42 as shown in FIG. 2, three springs 33a, 34a and 35a are shown. When the pin 37 of a feedback element is engaged by a lug 40 on the underside of a fan-shaped member 50, the spring 33a, merely rests on the beam 20. However, when the pin 37 is not engaged by a lug 40 so that the diaphragm is abutting the beam, the spring is compressed between the side lugs 49 in the beam, thereby imposing a force on the beam opposite to the feedback force imposed on the beam. This spring force is equal to the product of the diaphragm area of the individual feedback element and the calibration branch line pressure. As shown, only element 35 is not engaged by lug 40 and therefore is abutting the beam. The spring 35a is accordingly compressed between the beam and the side lugs 49. The configuration shown provides four increments of feedback in the system. FIG. 7 shows the underside of the fan-shaped element 50 and its lugs 40 and side lugs 49.

OPERATION

A controller of the type herein described is ordinarily calibrated at the time of its manufacture to control to a specific temperature at some given branch line pressure, say 72° F. at 8 p.s.i.g. Similarly the proportional band is usually adjusted to some specific fitting. Assuming each increment of the proportional band mentioned above corresponds to 2° of temperature change, than a setting of four would correspond to an 8° proportional band. Hence the temperature, assuming the set point is 72°, could vary between 68° and 76°. At 68°, the valve would be in its fully open position whereas at 76° the valve would be fully closed. Often times it is desirable to vary the set point and/or the proportional band after the controller is installed. It is not desired to recalibrate the device on each occasion the set point and/or the proportional band is changed.

In the controller disclosed, all that is necessary to preclude recalibration is to attain set-point proportional band independence by properly selecting the spring parameters of spring 46 in FIG. 2. For a given calibration pressure, say 8 p.s.i.g., the force on the beam due to the feedback elements can easily be calculated as simply the product of the diaphragm area of each element and the calibration pressure in the branch line. Knowing the distances of the feedback elements from the fulcrum and the distance of the spring to the fulcrum, it is easy to calculate the spring rate necessary to compensate for the feedback forces imposed on the beam as the proportional band dial is turned. Of course the thread size of the threaded member 42 is of great importance in this calculation. If the spring parameters are properly selected and the controller is properly calibrated, one may thereafter change the proportional band without affecting the set-point since as more or less feedback is dialed in, thereby widening or narrowing the proportional band, spring 46 exactly compensates for the feedback forces on the beam so the beam does not move and therefore branch line pressure is not changed. Hence, the set point is maintained. Similarly one can change the set point and after the system reached equilibrium and the controller is controlling at the new set point the proportional band will be the same as it was prior to changing the set point. Of course, if one changes the proportional band when the controller is not controlling at the set point, a change in branch line pressure will occur. However, after equilibrium is attained, the controller will nevertheless be controlling at the original set point.

While in the above description a pneumatic system has been described and the condition controlled has been assumed to be the temperature air, it should be understood that the scope of the invention described herein is intended to be limited only by the claims set forth below.

The embodiments of the invention in which an exclusive property or right is claimed are defined as follows:

1. In a condition controller with proportional band adjustment means independent of set point, including:
   beam means pivotably mounted intermediate its length;
   nozzle means adapted to receive fluid from a fluid supply means and adapted to be open or closed by said beam means;
   set-point means arranged to exert a biasing force on said beam means, said set-point means adjustable to cause a condition to be maintained at a desired set point; and
   condition-responsive means arranged to exert a force on said beam means proportional to the state of said condition;
   the improvement comprising,
   feedback means with selectively variable authority, said feedback means adapted to exert a force on said beam means, which force varies in accordance branch pressure caused by said beam means coacting with said nozzle means;
   force-exerting means arranged to exert a force on said beam means; and
   adjustment means adjustable to selectively vary the authority of said feedback means and simultaneously vary the force exerted by said force-exerting means so that the effect of the feedback force on said beam is nullified when said adjustment means is adjustable while said desired set point is being maintained, whereby the effect on said set-point means caused by varying the authority of said feedback means is nullified.

2. The improvement in a condition controller according to claim 1 wherein said feedback means comprises a plurality of feedback elements selectively operable to provide incrementally variable feedback.

3. The improvement in a condition controller according to claim 2 wherein said adjustment means comprises manually operable means including means to selectively render one or more of said feedback elements operable or inoperable.

4. The improvement in a condition controller according to claim 2 wherein said force-exerting means includes spring means constructed and arranged so that the force exerted by said spring means on said beam means is caused by the adjustment means to be decreased as said incrementally variable feedback is diminished, and to be increased as said incrementally variable feedback is increased.

5. The improvement in a condition controller according to claim 2 wherein said plurality of feedback elements are constructed and arranged to provide feedback in binary-coded incremental steps.

6. The improvement in a condition controller according to claim 3 wherein said manually operable means include dial means, said dial means having on one face thereof lug means constructed and arranged to selectively engage and thereby render inoperative one or more of said plurality of feedback elements.

7. The improvement in a condition controller according to claim 6 wherein each of said plurality of feedback elements comprises;
   a first member engageable with said lug means of said dial means;
   a second member abutting said beam means when said first member is not engaged by said lug means; and pressure-responsive means constructed and arranged to transmit a force through said second member to said beam means.

8. The improvement in a condition controller according to claim 6 wherein said manually operable means include a threaded member to the top of which said dial means is rotatably mounted, and said force-exerting means includes spring means, said spring means surrounding said threaded member and being in compression between said beam means and said manually operable means.